United States Patent [19]

Salvana et al.

[11] 4,284,174
[45] Aug. 18, 1981

[54] EMERGENCY OIL/MIST SYSTEM

[75] Inventors: Frank Salvana, Fairfield; Arnold Junker, Bridgeport, both of Conn.

[73] Assignee: Avco Corporation, Stratford, Conn.

[21] Appl. No.: 31,045

[22] Filed: Apr. 18, 1979

[51] Int. Cl.³ .............................................. F01M 1/18
[52] U.S. Cl. ................................... 184/6.4; 60/39.08; 184/6.26
[58] Field of Search ..................... 184/6.26, 6.4, 6.11, 184/55 R; 60/39.08, DIG. 3; 415/110, 111

[56] References Cited

U.S. PATENT DOCUMENTS

| | | | |
|---|---|---|---|
| 2,886,133 | 5/1959 | Mauck et al. | 184/6.26 |
| 2,986,433 | 5/1961 | Herrmann | 184/6.26 |
| 3,618,709 | 11/1971 | Boelkins | 184/6.4 |
| 3,779,345 | 12/1973 | Barnes et al. | 60/39.08 X |
| 4,106,468 | 8/1978 | Davis | 184/6.4 X |
| 4,153,141 | 5/1979 | Methlie | 184/6.4 X |

Primary Examiner—David H. Brown
Attorney, Agent, or Firm—Ralph D. Gelling

[57] ABSTRACT

An emergency oil/mist system is embodied in the main lubrication system for a bearing or gear box assembly of a gas turbine engine, and includes an auxiliary reservoir interconnected between the main source of pressurized lubricant and an air aspirating nozzle which is capable of either providing a stream of oil to the bearing, or a mist of lubricant to the bearing. A source of pressurized air is connected to the air aspirating nozzle through a control piston valve, and the latter also is provided in a vent line extending between the auxiliary reservoir and the atmosphere. During normal operation of the main lubrication system, the source of pressurized oil is connected through the auxiliary reservoir to the nozzle for providing a stream of lubricant to the bearing. Upon failure of the source of pressurized lubricant, the control piston valve is actuated so as to connect the auxiliary or emergency lubricant reservoir to the atmosphere by the vent conduit, and simultaneously connect the source of pressurized air to the air aspirating nozzle. The pressurized air passing through the nozzle aspirates or draws oil from the emergency reservoir to provide a spray or mist of lubricant to the bearing. The vent assures that the oil in the auxiliary reservoir is withdrawn at a controlled rate, thereby providing a spray of lubricant to the bearing for a limited period of time to enable the engine to maintain its operation. The emergency system produces an ultrasonic impingement of the oil as it leaves the air aspirating nozzle so as to create extremely small droplets of uniform distribution of oil on the bearing.

8 Claims, 4 Drawing Figures

EMERGENCY OIL/MIST SYSTEM

The subject invention relates to an emergency oil/mist system embodied in the main lubrication system for a bearing or gear box assembly of a gas turbine engine, and more particularly, to an emergency lubrication supply system for providing a pressurized spray of lubricant so as to create extremely small droplets of a uniform distribution of oil on the bearing for a limited period of time after failure of the main lubrication supply system.

In gas turbine engines, as employed in high speed aircraft, the rotational shafts are journalled within bearing boxes for rotation with respect to the engine frame members, and thus the bearings must be continually supplied with a stream of lubricant. Generally, the main lubrication supply system includes a large reservoir of lubricant, and pump means are provided for distributing the lubricant through conduits to the various bearings and gear box assemblies. The latter are usually housed within enclosed sumps such that the oil collected at the bottom of each sump is returned to the main reservoir by scavenging devices, after which the lubricant is again pumped in a continuous circuit back to the bearings or gear box assemblies. As is readily apparent, it is of extreme importance that the movable bearings or gear box assemblies are continuously lubricated in order to prevent premature failure by seizing of the relatively movable parts. The various components of the main lubrication supply system, because of their size, are generally located external to the engine casing where they are susceptible to damage, as in the case of a gas turbine engine as embodied in a military aircraft where the exposed components of the main lubrication supply system are vulnerable to enemy fire. As is readily apparent, in the case of a rupture or puncture in the oil lines or components in the main lubrication supply system, the oil pressure and flow to the individual bearings or gear box assemblies will be quickly interrupted, and continued operation of the gas turbine engine will rapidly result in seizure of the bearings and/or gear box assemblies, resulting in engine failure.

Heretofore in order that the gas turbine engine and the aircraft may continue to safely operate for a limited period of time after rupture or puncture of a component in the main lubrication supply system, an emergency oil reservoir has been suggested for providing lubricant to a lubricated part for a limited duration after failure of the main lubrication supply system. The inclusion of the emergency oil reservoir is of critical importance particularly for military aircraft operating under combat conditions, and generally it has been suggested that a plurality of emergency oil reservoirs be strategically located throughout the aircraft gas turbine engine in the vicinity of the bearings and gear box assemblies. Generally each emergency oil reservoir is filled from the main oil supply system and may include either a gravity feed drain or an air pressure means for supplying a stream of oil to the bearings, with the supply of oil from each emergency reservoir being generally closed off by a series of check valves during normal operation. In the event of a loss of oil pressure or supply, manual or automatic actuation of the check valves is required to open the supply of emergency oil. The disadvantage of such an emergency supply system is that closing off of the emergency oil reservoirs during normal engine operation results in oil stagnation which gradually leads to heat degradation of the oil, and the gravity feed system of most conventional emergency oil supply systems may not provide a sufficient stream of air to adequately lubricate the contacting surfaces of the lubricated parts and does not supply a cooling air flow to the lubricated parts.

It has also been known to provide an emergency lubrication supply system including an oil reservoir in substantial proximity to the lubricated part, with conduit means extending from the emergency reservoir having an outlet located adjacent the bearing to be lubricated. Pressurized air flow is continuously provided over the emergency reservoir outlet means for creating a suction therein for drawing lubricant through the conduit both during normal operation, and during emergency operation when the main oil source has been disabled. Accordingly, with this emergency lubrication supply system, lubricant within the emergency reservoir is continually being depleted during normal operation of the aircraft engine.

Accordingly, it is an object of the subject invention to provide a new and improved emergency oil supply system for providing, for a limited duration after failure of the main lubrication supply system, a pressurized spray of lubricant mist to the bearing in the form of small droplets of a uniform distribution of oil on the bearing for preventing seizure of the relatively movable parts, thereby precluding catastrophic engine failure.

It is a further object of the subject invention to provide an emergency oil supply system wherein the emergency oil reservoir is disposed in the circuit extending between the main lubrication supply and the bearing, such that the oil within the emergency reservoir is continually recirculated, and thus is not susceptible to becoming stagnant.

It is still a further object of the subject invention to provide an emergency oil supply system wherein the oil is aspirated from an emergency oil reservoir and is sprayed under high pressure in order to form extremely small droplets of oil which are uniformly distributed over the bearing, thereby expanding the period of time during which the emergency oil system is operative.

It is another object of the subject invention to provide an emergency oil supply system which is fully operative following failure of the main lubrication supply system.

The above and other objects and advantages of the invention are achieved by the subject emergency oil/mist system embodied in the main lubrication system of an aircraft gas turbine engine and including an auxiliary reservoir which is operatively connected in the conduit means extending between the main source of pressurized lubricant and the nozzle for applying oil onto a bearing or gear box assembly. The nozzle is capable of either directing a stream of oil to the bearing (when the main lubrication system is fully operative) or a mist of lubricant comprised of lubricant aspirated from the emergency reservoir and high pressure air (when the main supply lubrication supply system has failed). A control piston valve interconnects the emergency reservoir to an atmospheric vent, and also connects a source of pressurized air to the air aspirator nozzle. Upon failure of the main lubrication system, the control valve is actuated such that pressurized air is provided to the nozzle and, by air aspiration, withdraws oil remaining in the emergency reservoir. The valve also connects the emergency reservoir to the atmospheric vent thereby providing an effective control on the amount of oil aspirated from the emergency reservoir. By this arrangement, the emergency oil/mist lubrication system provides an ultrasonic impingement of droplets of oil as it leaves the nozzle, thereby creating extremely small droplets of uniform distribution of oil on the bearing or gear box assembly. Actuation of the control valve may be effected by the pressure balance piston type or solenoid valves triggered by low oil pressure in the main supply system or by excessive bearing or gear box temperatures.

Further objects and advantages of the invention will become apparent from a reading of the following detailed description of a preferred embodiment of the subject invention taken in conjunction with the drawings in which.

Figure 1:
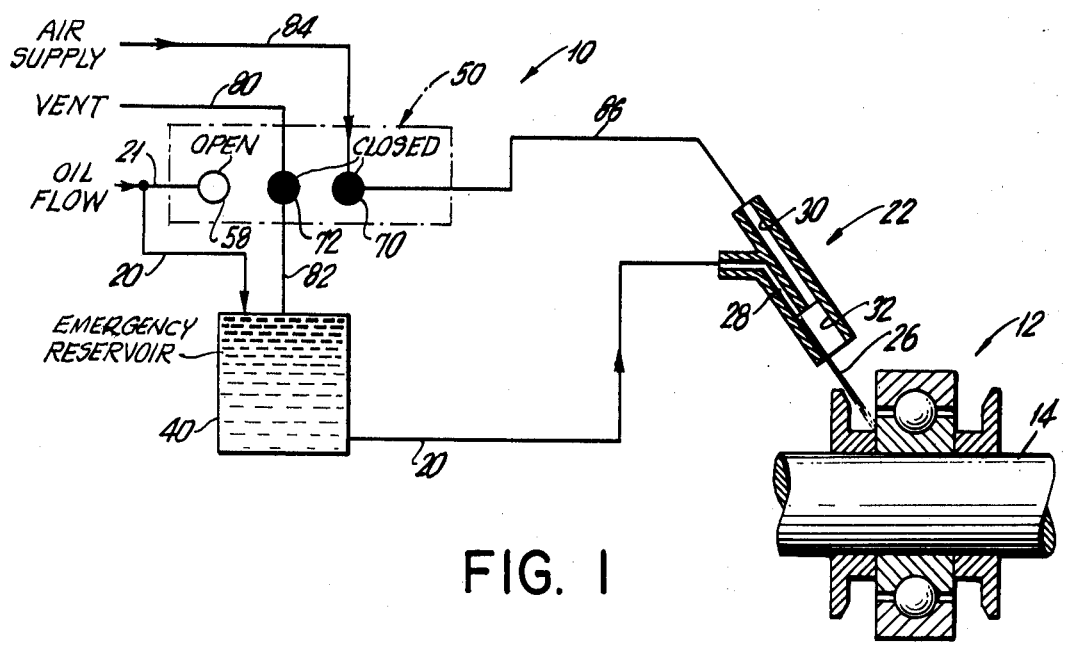
FIG. 1 is a schematic view of the emergency oil/mist lubrication system of the subject invention when the main lubrication system is fully operational.
Figure 2:
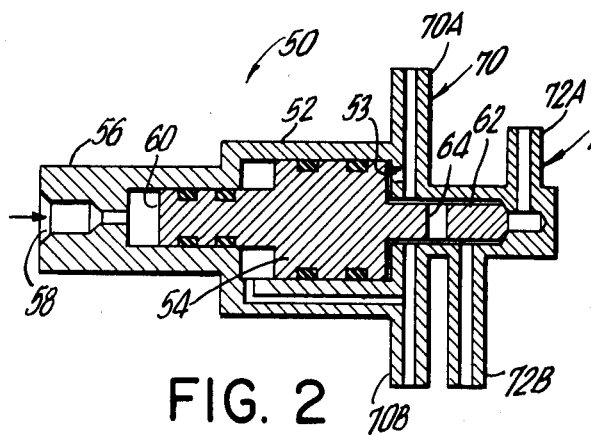
FIG. 2 is a schematic illustration of the control valve of the subject invention when the main lubrication supply system is fully operational as in FIG. 1.

Referring to FIGS. 1 and 2, the lubrication supply system of the subject invention is generally designated by the numeral 10 and is operative to provide lubricant to a bearing 12 which supports rotating shaft 14 of, for example, a gas turbine engine of an aircraft. The bearing 12 may be encased within a bearing cavity (not shown) having an oil scavenging line for recirculating lubricant provided to the bearing 12 to the main reservoir (not shown) for the lubrication supply system 10. Although the lubrication supply system of the subject invention is described in relation to an engine bearing, it is understood to have substantially broader application and may be applied to any engine part requiring lubrication.

The lubrication supply system 10 includes a main source of pressurized fluid, such as from a main supply reservoir (not shown) and suitable pump means (not shown) which are indicated in FIG. 1, as "oil flow" to the conduit 20 which extends to an air aspirating nozzle 22. The latter is located in proximity to the bearing 12 for providing a stream 26 of oil to the bearing 12. The air aspirating nozzle 22 is of generally tubular construction and includes two elongated passageways 28 and 30 leading to an enlarged outlet 32. Conduit 20 is connected to passageway 28 and during normal operation of the lubrication supply system 10, pressurized oil is passed through the conduit 20, through passageway 28 of nozzle 22, and onto the bearing 12.

The emergency oil/mist lubrication system of the subject invention is embodied in and forms a portion of the lubrication supply system 10 and includes an emergency oil reservoir 40 that is disposed in series in the conduit 20. Accordingly, during normal operation of the lubrication supply system 10, pressurized lubricant provided through the conduit 20 is likewise passed through the emergency oil reservoir 40 and then to the passageway 28 of the air aspirating nozzle 22, and is sprayed as stream 26 onto the bearing 12. Accordingly, the lubricant within the emergency oil reservoir 40 is constantly being replenished and depleted, thereby precluding stagnation of lubricant within reservoir 40 due to heat developed within the engine. Preferably, emergency oil reservoir 40 is located in proximity to the bearing 12, and is of a size in order to hold a quantity of approximately 100 cubic centimeters of oil whereby the emergency oil reservoir 40 is of sufficiently small size to be readily positioned within the confines of the engine housing. The emergency oil/mist lubrication system also includes an emergency control valve means 50 (see FIGS. 1 and 2) which may be of the piston valve type. Piston valve 50 may be of the pressure balance piston type and includes an outer cylindrical housing 52 in which piston 54 is slidably movable. One end 56 of the cylindrical housing 52 includes an opening 58 which is in communication via conduit 21 with the source of pressurized oil from the main supply reservoir. Opening 58 leads into the inner chamber of the cylinder and bears against the left hand end 60 of piston 54. The opposite end of piston 54 includes an extension 62 having a single through aperture 64. Cylindrical portion 52 of the piston valve includes two through passageways 70 and 72, as well as an aperture 53 interconnecting passageway 70 with the chamber on the right hand end of piston 54.

During normal operation of the lubrication supply system 10, the pressurized oil flow from the main supply source bears against the end 60 of the piston such that the piston is seated as shown in FIG. 2 and the piston extension 62 effectively closes off the passageways 70 and 72. At such time the force of the pressurized oil against the end 60 of piston 54 is greater than the force of the pressurized air applied to the right hand end of piston 54 through aperture 53. The upper end 70A of passageway 70 is connected to a source of pressurized air via supply conduit 84, while the lower portion 70B of passageway 70 is connected via a conduit 86 to the elongated passageway 30 in the air aspirating nozzle 22. The upper portion 72A of passageway 72 is connected via a conduit 80 to the atmosphere, while the lower portion 72B is connected via line 82 to the emergency oil reservoir 40.

As indicated above, during normal operation of the main lubrication/supply system 10, the extension 62 of the piston 54 is disposed as shown in FIG. 2 so as to block passageways 70 and 72, thereby preventing the emergency oil reservoir from being vented to the atmosphere via conduits 80 and 82, and also preventing the source of pressurized air flow from conduit 84 from being provided to the air aspirating nozzle 22.

In the event of an emergency, such as a puncture or rupture in the main oil reservoir or the pump means for pressurizing the main source of lubricant flow, pressure and flow in the conduit 20 will rapidly decrease. The possibility of a rupture or puncture in any component of the main oil supply system is of particular concern to military aircraft flying combat missions where the oil supply components, which are generally situated external to the engine casing, are more vulnerable to damage from enemy fire. Without lubrication, it is apparent that the high speed rotating shaft 14 would quickly seize, or the bearing 12 will become damaged thereby possibly resulting in catastrophic engine failure. The emergency oil/mist supply system of the subject invention is designed to provide a limited period during which an emergency ultrasonic spray of high pressure lubricant is provided to the bearing 12, as well as pressurized air flow capable of cooling the bearing 12 during the limited emergency period of the pressurized lubrication spray.

Figure 4:
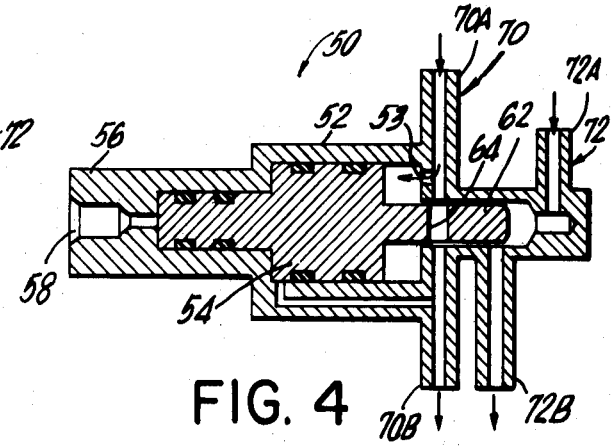
FIG. 4 is a schematic illustration of the control valve of the subject invention during the time when the emergency lubrication supply system is operational as in FIG. 3.
Figure 3:
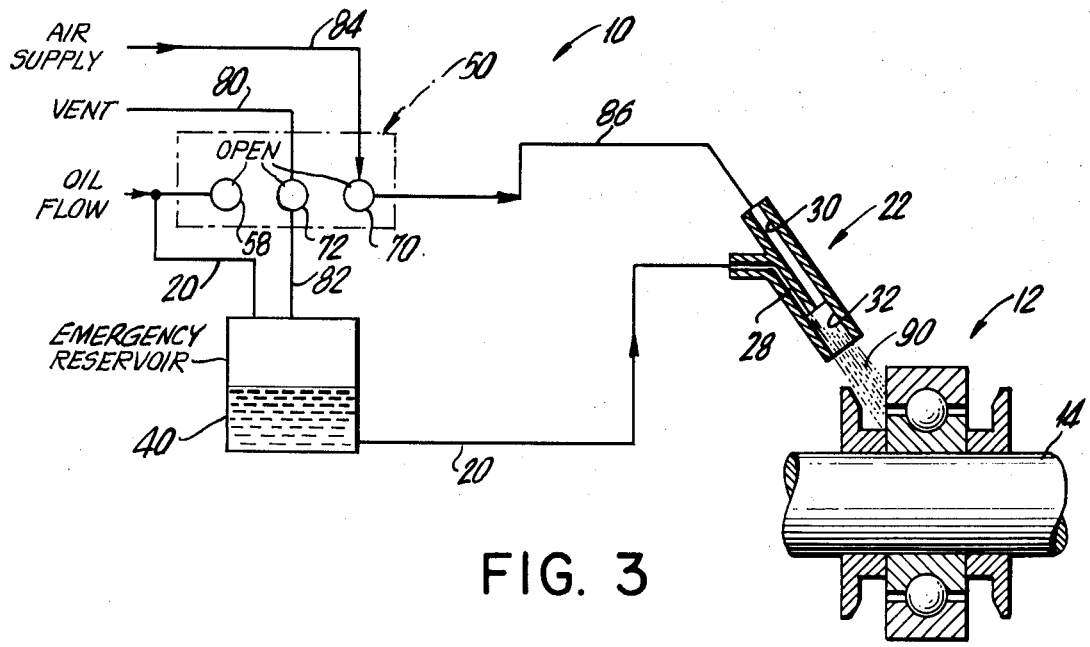
FIG. 3 is a schematic illustration of the subject emergency oil/mist lubrication system when the main supply system is disabled and the emergency lubrication supply system is fully operational.

During an emergency condition, the pressurized flow provided to the opening 58 of valve 50 rapidly decreases, thereby enabling the pressure balance piston 54 to be actuated toward the left, to the position as illustrated in FIG. 4, by virtue of the pressurized flow provided through aperture 53. Alternatively, actuation of piston valve 50 may be solenoid controlled in response to the rapid decrease in pressure of the main oil supply or a temperature sensor may be provided in the vicinity of the bearing 12 and may provide a triggering signal to a suitable solenoid operated valve for actuating piston 54 to the position as shown in FIG. 4. At such time, as shown in FIGS. 3 and 4, the emergency oil/mist lubrication system is operational, and the passageways 70 and 72 are opened, with aperture 64 being aligned with passageway 70. At such time the emergency oil reservoir 40 is vented to the atmosphere via conduits 82 and 80 which extend through passageway 72. In addition, pressurized air flow is provided via conduit 84, through passageway 70 to aperture 53 and also to conduit 86 leading to the passageway 30 in the air aspirating nozzle 22. The high pressurized air flowing through the passageway 30 emerges into the enlarged outlet 32 thereby effectively creating a partial vacuum in the nozzle 22 for aspirating lubricant from the emergency oil reservoir 40 via conduit 20 and passageway 28. The fact that the emergency oil reservoir 40 is vented to the atmosphere assures that the withdrawal of the emergency oil from the reservoir 40 is at a controlled rate in order to prolong emergency lubrication to the bearing 12 for a sufficient period of time to enable the pilot of the aircraft to make the necessary emergency maneuvers. The intermixture of the pressurized air and the oil aspirated from the emergency oil reservoir 40 results in a fine mist of small droplets of oil 90 (see FIG. 3) provided to the bearing 12. The emergency lubrication mist 90 automatically continues to flow and impinge on the contacting bearing surfaces 12 at a slow metered rate until the emergency oil reservoir 40 is emptied. It is estimated that with an emergency oil reservoir 40 having a capacity of approximately 100 cubic centimeters of oil, the emergency oil/mist system will be capable of operating for approximately one-half of an hour during which time high pressurized mist 90 provided to the bearing 12 whould be sufficient lubrication for continued operation of the bearing 12. In addition the pressurized air is effective to aid in cooling of the bearing.

Accordingly, there is provided a new and improved emergency oil/mist lubrication system which is formed as an integral part of the main lubrication system of a gas turbine engine and is designed to function as a mist lubricant generator in the event of failure of the main lubrication system. The emergency oil/mist lubrication system may be employed for bearings or gear box assemblies of a gas turbine engine, and the auxiliary or emergency reservoir has sufficient capacity to provide lubrication to the bearing assembly for approximately thirty minutes following failure of the main lubrication system. The subject system produces an ultrasonic impingement of the oil as it leaves the air aspirating nozzle 22 thereby creating extremely small droplets of uniform distribution of lubricant over the bearing. In addition, the flow of pressurized air to the bearing is effective in cooling the bearing during the emergency operation. The emergency oil/mist supply system can be actuated by a pressure balance piston-type valve or a suitable solenoid valve triggered by low oil pressure in the main supply system, or a solenoid valve which is triggered by suitable sensors for sensing excessive bearing temperatures.

While the invention has been described with respect to a specific embodiment thereof, it is readily apparent that various modifications, alterations, or the like may be apparent to those skilled in the art, and thus the invention is not to be limited by the illustrative embodiment, but by the spirit and scope of the following appended claims.

We claim:

1. An emergency lubricant/mist system for providing a pressurized spray of lubricant to a lubricated part for a limited period of time after failure of a main lubrication system comprising:

a source of pressurized lubricant;
air aspirating nozzle means directed to provide either a stream of lubricant or a spray of lubricant to the lubricated part;
conduit means interconnecting said source of pressurized lubricant to said nozzle means;
an emergency lubricant reservoir provided in said conduit means intermediate said source of pressurized lubricant and said nozzle means;
atmospheric vent means;
a source of pressurized air;
control means interconnecting: (1) said atmospheric vent means with said emergency lubricant reservoir; and (2) said source of pressurized air with said air aspirating nozzle means; said control means being operatively connected to said source of pressurized lubricant whereby when the main lubrication system is operational, said control means is operative to inhibit the flow of pressurized air from said source of pressurized air to said air aspirating nozzle means and to inhibit said emergency lubricant reservoir from being vented to the atmosphere, whereas upon failure of the main lubrication system, said control means is effective to vent the emergency lubricant reservoir and simultaneously allow pressurized air to be provided to the air aspiration nozzle means from the source of pressurized air, such that the pressurized air passing through the nozzle means is effective to aspirate lubricant from the emergency lubricant reservoir to create a pressurized spray of lubricant to said lubricated part.

2. An emergency lubricant/mist system for providing a pressurized spray of lubricant to a lubricated part for a limited period of time after failure of a main lubrication system as in claim 1 wherein said control means comprises a piston valve including an outer cylindrical casing and a piston slidably mounted therein, said cylinder including a plurality of aligned passageways extending therethrough, which passageways are connected to said atmospheric vent means, said source of pressurized air, said emergency lubricant reservoir, and the air aspirating nozzle means, with the position of the slidable piston being a function of the flow of pressurized lubricant.

3. An emergency lubricant/mist system for providing a pressurized spray of lubricant to a lubricated part for a limited period of time after failure of a main lubrication system as in claim 1 wherein said air aspirating nozzle means is generally tubular and includes two passageways leading to an enlarged outlet main passageway, with one passageway connected to said conduit means extending to the source of pressurized lubricant, while the other passageway is connected to the conduit extending to the source of pressurized air.

4. An emergency lubricant/mist system for providing a pressurized spray of lubricant to a lubricated part for a limited period of time after failure of a main lubrication system as in claim 1 wherein the volume of the emergency lubricant reservoir is approximately 100 cubic centimeters.

5. An emergency oil/mist system for providing a pressurized spray of oil to a lubricated part for a limited period of time after failure of a main lubrication system comprising:

a source of pressurized oil;

an air aspirating nozzle for providing oil to the lubricated part, said nozzle including two generally parallel passageways leading to an enlarged outlet for said nozzle;

conduit means interconnecting the source of pressurized oil to said nozzle;

an emergency lubricant reservoir disposed in the conduit means intermediate said source of pressurized oil and the nozzle;

atmospheric vent means;

a source of pressurized air;

a piston control valve interconnecting: (1) said atmospheric vent means with said emergency lubricant reservoir; and (2) the source of pressurized air with the air aspirating nozzle, with the piston of said piston control valve being actuated in response to the pressurized lubricant in the conduit means such that when the main lubrication system is operational, the piston is operative to inhibit interconnection between said atmospheric vent means and the emergency lubricant reservoir, as well as inhibit interconnection between the source of pressurized air with the air aspirating nozzle, whereas, upon failure of the main lubrication supply system, the piston is actuated so as to interconnect the emergency lubricant reservoir with the atmospheric vent means and simulteneously interconnect the source of pressurized air with the air aspirating nozzle such that the pressurized air passing through one of the passageways in the nozzle is effective to aspirate oil from the emergency lubricant reservoir to create a pressurized mist of lubricant which is sprayed out of the enlarged nozzle outlet for providing lubricant to the lubricated part, as well as providing cooling pressurized air flow to the lubricated part.

6. An emergency oil/mist system for providing a pressurized spray of oil to a lubricated part for a limited period of time after failure of a main lubrication system, as in claim 5 wherein the volume of the emergency lubricant reservoir is approximately 100 cubic centimeters.

7. An emergency oil/mist system for providing a pressurized spray of oil to a lubricated part for a limited period of time after failure of a main lubrication system, as in claim 5 wherein the piston control valve includes an outer cylindrical casing and a piston slidably mounted therein, said cylindrical including a plurality of aligned passageways extending therethrough, which passageways are connected to said aspirating vent means, said source of pressurized air, said emergency lubricant reservoir, and the air aspirating nozzle.

8. An emergency oil/mist system for providing a pressurized spray of oil to a lubricated part for a limited period of time after failure of a main lubrication system, as in claim 7 wherein the piston control valve is of the pressure balance type and the position of the slidable piston is responsive to the oil pressure drop and the introduction of the pressurized air source acting on the pressure balance piston.

* * * * *